United States Patent [19]

Blandy et al.

[11] Patent Number: 5,390,315
[45] Date of Patent: Feb. 14, 1995

[54] ALLOCATION OF UNIFORM CONTIGUOUS BLOCKS OF DASD STORAGE BY MAINTAINING BOTH A BIT AND A BIT MAP RECORD OF AVAILABLE STORAGE

[75] Inventors: Geoffrey O. Blandy, Vestal; Catherine M. Rossi, Endicott, both of N.Y.

[73] Assignee: International Business Machines Corporation, Armonk, N.Y.

[21] Appl. No.: 898,874

[22] Filed: Jun. 15, 1992

[51] Int. Cl.6 .............................................. G06F 12/02
[52] U.S. Cl. ................... 395/425; 395/600; 364/967.5; 364/DIG. 2
[58] Field of Search .............................. 395/600, 425

[56] References Cited

U.S. PATENT DOCUMENTS

| | | | |
|---|---|---|---|
| 4,528,624 | 7/1985 | Kamionka et al. | 395/650 |
| 4,536,837 | 8/1985 | Olson et al. | 395/600 |
| 4,660,130 | 4/1987 | Bartley et al. | 395/400 |
| 5,021,946 | 6/1991 | Korty | 364/200 |
| 5,200,864 | 4/1993 | Dunn et al. | 360/48 |
| 5,247,638 | 9/1993 | O'Brien et al. | 395/425 |
| 5,247,660 | 9/1993 | Ashcraft et al. | 395/600 |

FOREIGN PATENT DOCUMENTS

| | | | |
|---|---|---|---|
| 5608890 | 6/1990 | Australia . | |
| 0061585 | 2/1982 | European Pat. Off. | G06F 13/00 |
| 0406188 | 5/1990 | European Pat. Off. | G11B 20/12 |

OTHER PUBLICATIONS

Reingold et al., *Data Structures*, Little, Brown & Company, (Boston, 1983) pp. 259–270.

Widerhold, *Database Design*, McGraw-Hill Book Company (New York, 1983) pp. 335–340.

Billiris, "An Efficient Database Storage Structure for Large Dyanmic Objects," *Eighty International Conference on Data Engineering*, 2–3 Feb. 1992 IEEE Computer Society Press pp. 301–308.

*Primary Examiner*—Thomas G. Black
*Assistant Examiner*—Paul R. Lintz
*Attorney, Agent, or Firm*—Arthur J. Samodovitz

[57] ABSTRACT

A computer system allocates locations in DASD to store a specified length of data. The allocation attempts to minimize the number of I/O operations and seek time for accessing the DASD. The system records addresses and lengths of sets of contiguous available storage locations in the DASD. Then, the system searches the record to attempt to identify a set of contiguous available storage locations having the specified length and another set of contiguous available storage locations having a length which exceeds the specified length by an amount likely to accomodate most lengths of data subsequently to be stored on the DASD. If the search is successful in identifying a set of contiguous available storage locations having the specified length, the set is allocated to store the data, and if the search is not successful in identifying a set of contiguous available storage locations having the specified length but is successful in identifying another set of contiguous available storage locations having a length which exceeds the specified length by an amount likely to accomodate most subsequent lengths of data to be stored in the DASD, then the other set is allocated. To minimize radial movement of the read/write head, only sets that are located within the same extent are recorded.

24 Claims, 7 Drawing Sheets

ALLOCATION OF UNIFORM CONTIGUOUS BLOCKS OF DASD STORAGE BY MAINTAINING BOTH A BIT AND A BIT MAP RECORD OF AVAILABLE STORAGE

BACKGROUND OF THE INVENTION

The invention relates generally to computer systems, and deals more particularly with a technique for allocating locations on DASD to store data; the allocation efficiently uses available storage in the DASD and minimizes overhead associated with accessing of the data on DASD.

In many computer systems, such as an IBM VM/ESA 1.1 computer system, external storage is provided by a direct access storage device (DASD). The DASD can comprise one or more magnetic disks. If more than one magnetic disks is included in the DASD, they are stacked as "platters" along a common axis. Each of the disks comprises a large number of coaxial circular tracks to store the data. If the DASD comprises a single disk, then a single read/write head is provided. The disk rotates such that when the read/write head is stationary, the read/write head can read all the information stored on a track during one complete rotation of the disk. The read/write head can also move radially to read other tracks. If the DASD comprises multiple disks, then one read/write head is provided for each disk. All the read/write heads are aligned under the same location of each disk and fixedly connected to each other to move in unison. Only one read/write head is sensed at any one time. A "cylinder" is defined as a collection of circular tracks, one per disk, that are vertically aligned. For a DASD comprising multiple disks, an extent comprises one or more cylinders. To read one cylinder, the DASD is rotated a number of times equal to the number of platters, and during each rotation, a different one of the read/write heads is sensed. To read one extent of the type comprising multiple adjacent cylinders, the foregoing process is repeated for each cylinder with a corresponding radial movement of the read/write head.

In the foregoing DASD arrangements, one factor which limits the speed of accessing (writing to or reading from) the DASD, is the time required to move the read/write head(s) radially from cylinder to another. Therefore, it is desirable to minimize the amount of radial movement of the read/write head required for each access. If the allocated addresses are not contiguous, then the allocated addresses may be radially spaced from each other, and require additional radial movement of the read/write head between the spaced addresses. A second factor which limits the speed of accessing the DASD is the time required for the data to rotate so that it is positioned under the read/write heads. Therefore, it is desirable to minimize the amount of rotational movement required for each access. When I/O is performed to non-contiguous addresses, extra time is required to allow the data that is not being accessed to pass under the read/write heads. A third factor is the number of I/O operations required to complete the access. An I/O subsystem controls the DASD and must specify a start location on DASD and length information for each discontiguous set of storage locations. Therefore, it is desirable to minimize the number of I/O operations that are required for each I/O access. If the data to be written to DASD can all be stored in one contiguous set of locations in DASD, then a single I/O operation suffices because only one start location and one length need be specified. However, if there is not one contiguous set of locations which is available to accomodate all the data, then the data must be split between discontiguous of locations, and this requires one I/O operation for each discontiguous set.

A fourth factor in managing the DASD is to avoid waste of storage capacity. Unfortunately, during continued usage of the DASD the available storage areas may become fragmented. For example, assume that ten pages of data (4,096 bytes per page) are stored in a fully utilized area of DASD. Each page utilizes one "slot" of storage. Next, an application program requests access to the ten pages, and the ten pages are written into main storage (RAM) to facilitate such access. The application program modifies eight of the ten pages and adds a page, but does not change the other two original pages. Subsequently, the operating system detects that the main storage is nearly full, and initiates a "block paging" operation to free-up the main storage by writing some of the pages in the main storage to DASD. There are various criteria by which the operating system decides which pages to write to DASD to free-up the main storage. According to one common criterion, the operating system selects a group of pages that were accessed at approximately the same time. This may lead to the selection of all of the foregoing ten pages. However, to minimize the amount of I/O work, the two unchanged pages are not written back to DASD; the original copy on the DASD is still valid. Therefore, only the eight updated pages and the additional page must be written to DASD, but the original location in the congested area can only store eight pages in contiguous locations. Therefore, a new location must be selected to store some or all of the nine pages. If a single set of nine contiguous slots is sought to minimize the number of I/O operations and limit radial movement of the read/write head, there will be an isolated set of eight contiguous slots which is available for other data. This process frequently repeats so that over time, there may be many isolated sets of different numbers of available slots on the DASD. To avoid wasting available storage on the DASD, techniques must be used to either avoid creating such isolated sets or to locate and use them for subsequent write operations. However, as noted above, the number of I/O operations and amount of radial head movement and rotational delay should be minimized.

One prior art technique logically divides the DASD into sets of slots of a fixed size, for example, ten slots per set. Whenever the operating system needs to write data to DASD, one or more of such sets is allocated to accomodate the request. Because of other criteria which govern the amount of data to be written to DASD, the amount of data to be written is often less than the allocation. This wastes storage capacity and leaves gaps which require rotational movement to bypass. Also, if the data to be written requires more than one set of the slots, then two or more I/O operations are normally required. The two or more sets are selected by a "moving cursor" which steps through the DASD in ascending DASD address to satisfy each successive request.

Another prior art technique utilizes a moving cursor to step through the DASD in ascending DASD address to satisfy each storage request made by the operating system. According to this technique, the allocations are not restricted to sets of fixed size, but instead attempt to precisely match the length of the storage request. As the moving cursor proceeds through the DASD to satisfy new requests, some of the data previously written to the DASD is accessed, i.e. read into main storage. Then a subset of those pages may be modified or regrouped and rewritten to a new DASD address, freeing the old DASD locations. This leaves gaps in the DASD. Another operating system function constantly monitors the availability of storage behind the cursor, and when seventy five percent of the slots behind the cursor become available, the cursor is moved back to the beginning. Then, the cursor moves forward again and allocates the available slots in order of location on the DASD to accomodate subsequent requests. While this technique minimizes the amount of available sets of isolated slots, the technique tends to fragment the storage of related data requiring extra I/O operations and radial and rotational movement of the read/write head.

Accordingly, a general object of the present invention is to provide a computer system, program or method which allocates DASD to minimize the number of I/O operations required to accomodate the data to be written to DASD, yet efficienlty utilizes the available storage on the DASD.

Another object of the present invention is to provide a computer system, program or method of the foregoing type which minimizes the amount of radial read/write head movement and rotational movement required to access the data.

SUMMARY OF THE INVENTION

The invention resides in a computer system, method and program product for allocating locations in DASD to store a specified length of data. The system, method and program product record addresses and lengths of sets of contiguous available storage locations in the DASD. Then, the system, method and program product searches the record to attempt to identify a set of contiguous available storage locations having the specified length and another set of contiguous available storage locations having a length which exceeds the specified length by an amount likely to accomodate most lengths of data subsequently to be stored on the DASD. If the search is successful in identifying a set of contiguous available storage locations having the specified length, the set is allocated to store the data, and if the search is not successful in identifying a set of contiguous available storage locations having the specified length but is successful in identifying another set of contiguous available storage locations having a length which exceeds the specified length by an amount likely to accomodate most subsequent lengths of data to be stored in the DASD, then the other set is allocated. To minimize radial movement of the read/write head, only sets that are located within the same extent may be recorded.

According to one feature of the present invention, the system, method and program product also attempt to identify a third set of contiguous available storage locations having a length which exceeds the specified length by a lesser amount than any other set in the record, and if the search for the set whose length equals the specified length and the search for the set whose length exceeds the specified length by an amount that is likely to accomodate most subsequent lengths of data are both unsuccessful, then the third set is allocated.

According to another feature of the present invention, the search also attempts to identify from the record two or more sets which together have a length equal or greater than the specified length if no single set in the record has a length which equals or exceeds the specified length. In such a case, the two or more sets are allocated.

DETAILED DESCRIPTION OF THE PREFERRED EMBODIMENTS

Figure 1:
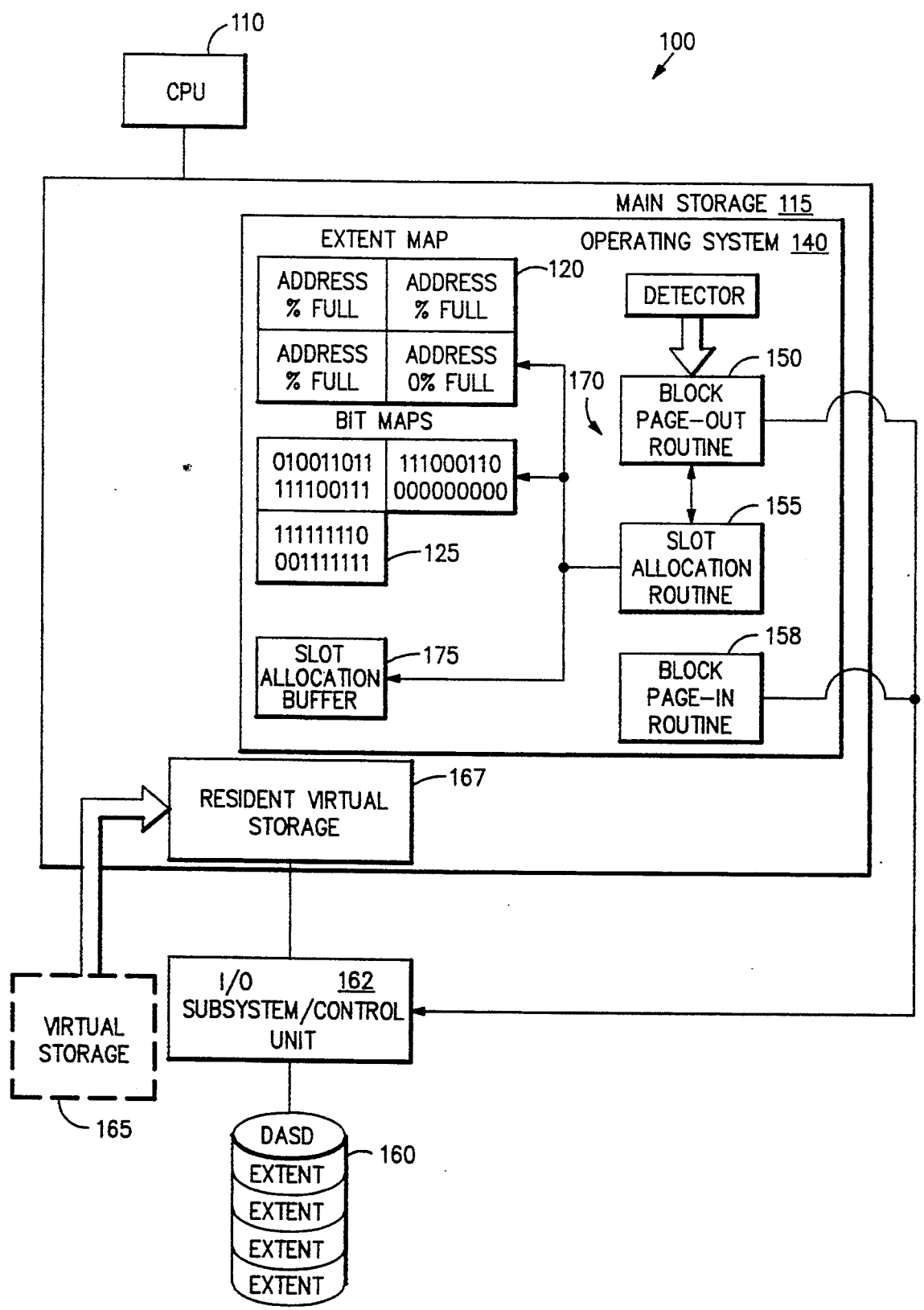
FIG. 1 is a block diagram of a computer system which incorporates the present invention.

Referring now to the figures in detail wherein like reference numerals indicate like elements throughout the several views, FIG. 1 illustrates a computer system, generally designated 100, which includes the present invention. Computer system 100 comprises a CPU 110, main storage 115, DASD 160, an I/O subsystem 162 and an operating system 140. By way of example, CPU 110 and associated hardware (not shown) are provided by an IBM System/390 computer system. This system is described in a document entitled ESA/390 Principles of Operation, which document is available from International Business Machines Corp. at Mechanicsburg, Penna. by order number SA22-7201-00. Virtual storage 165 is allocated to each user/application program to store the application program and associated files or other data. The contents of virtual storage may be stored in resident virtual storage 167 in main storage 115, DASD 160 or elsewhere. Main storage 115 stores the operating system 140, associated tables and control blocks generated during execution of the operating system, and data and pages of virtual storage during manipulation by the CPU. DASD 160 provides a large amount of nonvolatile storage for the files and other data generated by the users/application programs and to hold the contents of virtual storage pages when not being accessed by the CPU. The I/O subsystem provides low level control for accessing specified locations in the DASD. The operating system 140 can provide a virtual machine or nonvirtual machine execution environment. By way of example, operating system 140 is provided by IBM's Virtual Machine/Enterprise Systems Architecture (VM/ESA) 1.1 operating system, except for the new features which comprise the present invention. The VM/ESA 1.1 operating system is described in a publication entitled VM/ESA General Information, which publication is available from International Business Machines Corporation at Mechanicsburg, Penna. by order number GC24-5550-02.

The operating system 140 includes a virtual memory manager subsystem 170 comprising a block page-out routine 150 (found in the VM/ESA 1.1 operating system) and a new slot allocation routine 155. One function of the virtual memory manager 170 is to move groups of related virtual pages from main storage 115 to DASD 160 in response to a request by another function in the operating system to free-up main storage. After receiving the request, the block page-out routine identifies a group of pages in virtual storage that currently reside in main storage and were accessed at approximately the same time. Then, the block page-out routine calls the slot allocation routine to obtain the optimum DASD slots to accomodate the group. Parameters in the call identify the total number of pages of the group and the address to store the DASD addresses allocated by the slot allocation routine. The criteria by which the slot allocation routine selects the optimum DASD slots are as follows: First, the number of discontiguous sets of contiguous storage slots on the DASD (a "slot" being just large enough to store one page of data) should be minimized because a different I/O operation and additional rotational movement are required for each discontiguous set. Preferably, all of the selected DASD slots are contiguous so the block page-out routine can perform a single I/O operation to write out the entire group of pages. Otherwise, it will perform multiple I/O operations, one for each set of contiguous slots. Second, the one or more slots required to store this group of pages should be located relative to each other and to other subsequent groups such that the radial reader head movement and rotational movement required to access all the slots should be minimized. To this end, the slot allocation routine attempts to satisfy successive allocation requests from a localized region within a single extent. As noted above, an extent is a localized and contiguous storage area on the DASD which can be accessed with minimal radial movement of the reader head. Third, the allocation request should be satisfied, if possible, without leaving any small fragments or groups of slots which would not likely satisfy a subsequent request individually. To this end, during a first pass through an extent, the slot allocation routine searches for sets of contiguous available slots which either equal the allocation request leaving no fragment or which exceed the allocation request by so much that the remaining fragment would be large enough to satisfy most other subsequent requests. Also during the first pass, the slot allocation routine identifies a set, if any, of contiguous available slots which is larger than the allocation request and leaves a smaller fragment than any other set. If the first pass is unsuccessful in identifying an exact fit or a set which exceeds the allocation request by the large fragment, then the slot allocation routine selects the set, if any, of contiguous available slots which is larger than the allocation request and leaves the smallest fragment. If the first pass is unsuccessful in identifying any set which is larger than the allocation request, then the slot allocation routine makes a second pass of the same extent to identify multiple sets of contiguous available slots which together satisfy the allocation request. If such sets identified in the second pass cannot fully satisfy the allocation request, then the slot allocation routine continues with a pass through the next extent to complete the allocation.

The following is a more detailed description of the slot allocation routing and other aspects of the present invention. The DASD 160 is logically divided into multiple, active extents by an extent map 120 which is maintained in main storage and defines the beginning and ending real address of each active extent. An "active" extent is an extent that has one or more allocated slots. The extent map also includes a field for each active extent which specifies the percent to which the extent is currently utilized. As described in more detail below, the slot allocation routine references the extent map to determine which extent is a good candidate in which to search for available storage.

A bit map 125 is also maintained in main storage for each extent to map the availability of slots in the extent. Each bit map is partitioned such that a single bit in each part of the bit map represents a corresponding slot in the extent. The value of the bit indicates whether the slot is unavailable, i.e. currently allocated, or available. The extent map also describes those inactive extents (those which are currently completely available); however, to minimize storage, no bit map is provided for inactive extents. As described in more detail below, the slot allocation routine uses each bit map to generate a corresponding slot allocation buffer to expedite the search for available storage in the respective extent.

Figure 2:
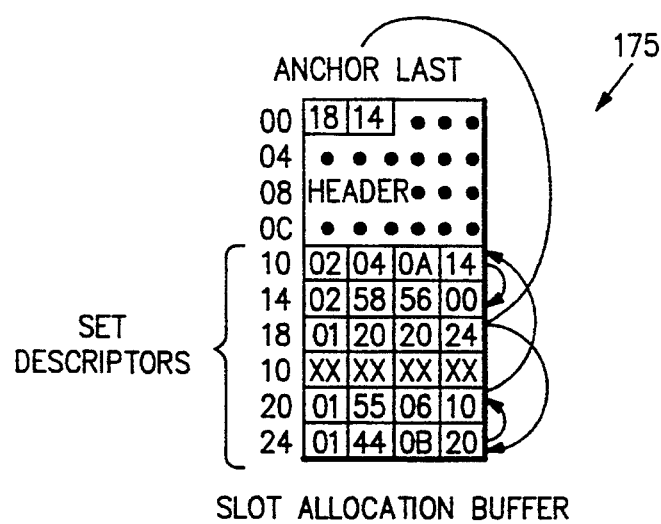
FIG. 2 is a pictoral representation of a slot allocation buffer within the computer system of FIG. 1, which buffer indicates the locations and sizes of available sets of contiguous slots within each extent.

FIG. 2 illustrates the slot allocation buffer in detail. The slot allocation buffer comprises a header and set descriptors. Each set descriptor resides within the slot allocation buffer and describes a set of contiguous available slots in the extent. The header contains first and second pointers to the first and last set descriptors, respectively in the buffer which represent the first and last set of contiguous slots. If the first pointer is zero, then there are no available sets in the extent suitable for representation in the slot allocation buffer. It should be noted that the slot allocation routine classifies sets of different lengths into three categories. "Maxi-fragments" are sets whose length is so large that one large fragment can satisfy most allocation requests individually. "Midi-fragments" are sets with a shorter length but still long enough to many of the allocation requests individually . "Mini-fragments" are sets with still shorter length, and rarely can satisfy an allocation request individually. By way of example, one large fragment can store ten or more pages of data (with each page comprising 4096 bytes) and a large fragment having ten contiguous slots can satisfy seventy five percent of the allocation requests alone; one medium fragment can store four to nine pages of data; and and one small fragment can store one to three pages of data and a small fragment having three contiguous slots can satisfy five to ten percent of the allocation requests alone. Except when there are very few unused slots in any extent in the DASD, small fragments are not represented in the slot allocation buffer. This minimizes the search time within each slot allocation buffer, and omits nonoptimum sets. To further reduce the storage requirement and search time and to localize radial movement, each slot allocation buffer stores set descriptors only for a limited number of the sets within each extent. Other of the sets remain unrepresented in the slot allocation buffer until one or more of the set descriptors are fully utilized or utilized to the extent of leaving only a small fragment, thereby making room for set descriptors representing one or more other sets of contiguous available slots within the same extent. (Nevertheless, the bit map for each extent represents all of the slots in the extent.)

The first two bytes in each of the set descriptors indicate the real displacement from the start of the extent, the next byte indicates the length in bytes of the set, and the final byte points to the next set descriptor in the slot allocation buffer. Thus, the last byte in each set descriptor queues the set descriptors from one another (and the first pointer in the header identifies the first set descriptor in the queue). The slot allocation routine logically arranges the queue of set descriptors by ascending DASD address starting with the element designated by the first entry in the first row. Thus, the slots near to each other and the physical beginning of the extent are examined first in the selection process. As described in more detail below, this will improve the chances that sets of available contiguous slots are selected in order, either for the same allocation or successive allocations, and this further minimizes the requisite amount of seek time (i.e. radial head movement) for the same and subsequent allocations. The slot allocation routine uses the slot allocation buffer 175 to quickly identify the available sets of contiguous slots in the extent and the length of each set. With this information, the slot allocation routine can quickly identify the optimum contiguous sets of slots required to satisfy the request, thereby reducing the processing time required to move the pages to DASD. Also, each of the set descriptors is one fullword in length and all the set descriptors within one slot allocation buffer are stored in a continuous block, so the contents of an entire slot allocation buffer can be inspected with a single memory to cache transfer.

The following is a description of the allocation process. Initially, an operating system function notes that the free space in main storage has fallen below a predetermined level and alerts the block page-out routine. In response, the block page-out routine identifies a group of pages that are currently represented by virtual storage, actually stored in main storage and were accessed at approximately the same time. Then, the block page-out routine calls the slot allocation routine with a request to allocate the requisite number of slots in DASD to store the group of pages. The request also includes a main storage location into which the slot allocation routine should store the DASD slot addresses when allocated. With this information, the block page-out routine can subsequently direct the I/O subsystem 162 to physically write the data to DASD 160.

The allocation process of the present invention also minimizes overhead when a user/application program references one or more pages from the user/application program's virtual storage, and the referenced page(s) were previously written to DASD locators allocated by the slot allocation routine. In such a case, a page-in routine 158 within the virtual memory manager requests that the referenced page(s) and all other pages that were previously written out to DASD with the referenced page(s) be read into main storage. The reason for reading these other pages to main storage is the assumption that the user/application program will probably soon reference these other pages which are probably related to the referenced pages. Because the referenced page(s) and the other pages are likely stored in one set of contiguous slots, there is a minimum of I/O operators and radial read and rotational movement required during the reading process.

FIGS. 5-10 illustrate processing by the slot allocation routine. The slot allocation routine receives the allocation request (step 504 of FIG. 3), and sets a flag to indicate that a first pass search will commence through the current slot allocation buffer to identify optimum sets to satisfy the request (step 510). If this is the first allocation request since initial program load, then there is not yet a "current" slot allocation buffer (to satisfy the allocation request) or set descriptors within the slot allocation buffer (decision 514) or even a current extent. The selection of the current extent must precede the generation of the slot allocation buffer. To select the current extent, the slot allocation routine first considers the extent with the lowest relative address (decision 514 and step 910). The following describes the process of selecting a current extent when the first allocation request is made after initial program load, and subsequently, when a current extent cannot satisfy an allocation request. In step 910 (FIG. 7), the slot allocation routine first considers the extent with the lowest slot address as a candidate to satisfy the allocation request. To avoid unsuccessful searches, the slot allocation routine prefers to search extents which are substantially empty. Thus, only if the first extent is seventy percent or more empty is it immediatley selected as the current extent for satisfying the allocation request (decision 914), then, a small fragment flat is reset to prevent representation of small fragments in the slot allocation buffer (step 940). Next, a branch is made to initialize the respective slot allocation buffer (step 950) as described below. Otherwise, the slot allocation routine determines if this extent is the emptiest extent yet encountered (which is always true for the 1st iteration) (decision 918) and its address is saved (step 922). If this extent is not the last extent on the DASD (decision 926), the next extent is considered as a candidate to satisfy the allocation request (step 930) and the iterative process beginning with step 914 is repeated. During the repeated iterations of this process, if any extents which are seventy percent or more empty are encountered, then such an extent is selected to satisfy the allocation request, and the iterations conclude with a branch to step 950. As described below, step 950 begins a subroutine for initializing the extent, i.e. generating a slot allocation buffer, as a prelude to the actual search which begins with decision 514. However, if no extents are encountered that are at least seventy percent empty and all the extents have been considered, the emptiest extent is selected to satisfy the allocation request (step 934). If this extent is at least twenty percent or more empty (decision 938), then a jump is made to the step 950. However, if this emptiest extent is less than twenty percent empty, then the small fragment flag is set so that small fragments can be selected (step 942), and a branch is made to the step 950.

In step 950, a cursor is initialized to the first bit in the bit map for this extent, and the header in the slot allocation buffer is set to zero to indicate there are currently no set descriptors queued. Then, the slot allocation routine calls a refill subroutine 954 illustrated in FIG. 9 providing the address is the slot allocation buffer for the first set descriptor. The refill subroutine is responsible for generating the slot allocation buffer set descriptors based on the corresponding bit map. In response to the call, the refill subroutine scans the corresponding bit map beginning with the bit designated by the bit map cursor and concludes this scan when a zero bit is found or the end of the bit map is reached (step 1010). The zero bit represents an available slot. If the scan reached the end of the bit map without finding a zero bit (decision 1014), the return code is set to nonzero to indicate failure and a return is made to the caller (step 1044). Otherwise, another scan is performed starting with the zero bit located by the previous scan (step 1018). It terminates when a non-zero bit is found or the end of a cylinder is reached. This second scan length represents the length of the set of contiguous available slots. This length is calculated by subtracting the zero bit location from the nonzero bit location (step 1026). If the flag indicating that the small fragments should be used is set (decision 1030) or the length is equal or greater than the medium fragment length (decision 1040), the beginning and ending locations and length of the set are stored as the current set descriptor (step 1034), the return code is set to zero to indicate success, and the refill subroutine returns to the caller. Otherwise (the length was too small), the process continues by branching to step 1010 to search the bit map for the next set. When the refill subroutine returns to the caller, if the return code is set to zero this means that the set descriptor was successfully filled. Then, the slot allocation routine queues this set descriptor as the last set descriptor in the slot allocation buffer (step 964). Next, the slot allocation routine determines if the slot allocation buffer is full (decision 970). If not, then another empty set descriptor is filled in another iteration of the refill subroutine 954 as above. This iterative process continues until either there are no more sets which meet the aforesaid criteria or the slot allocation buffer is completely filled. In either case, processing continues with step 514 in which the slot allocation buffer is searched to satisfy the allocation request. Referring again to decision 960, if the refill subroutine was not successful, a branch is made to step 514 to search those set descriptors that have been queued. Note that in this situation, the slot allocation buffer will not have the full complement of set descriptors. After selecting an extent to satisfy the allocation request and filling the corresponding slot allocation buffer, the slot allocation routine reads the first set descriptor (corresponding to a set), which set descriptor is identified by the first pointer in the header (step 522). During the first pass, only sets of contiguous available slots that are as large or larger than the allocation request will be considered thereby allowing one contiguous set to satisfy the entire allocation request so that the write operation can be performed with a single I/O operation (right and lower legs of decision 526). Consequently, if any of the set descriptors under consideration have a length which is less than the requested allocation, then the left leg of decision 526 leads to decision 810 which leads back to decision 542 which checks to see if this is the end of the queue. If not, the next set descriptor is selected (step 546).

Figure 4:
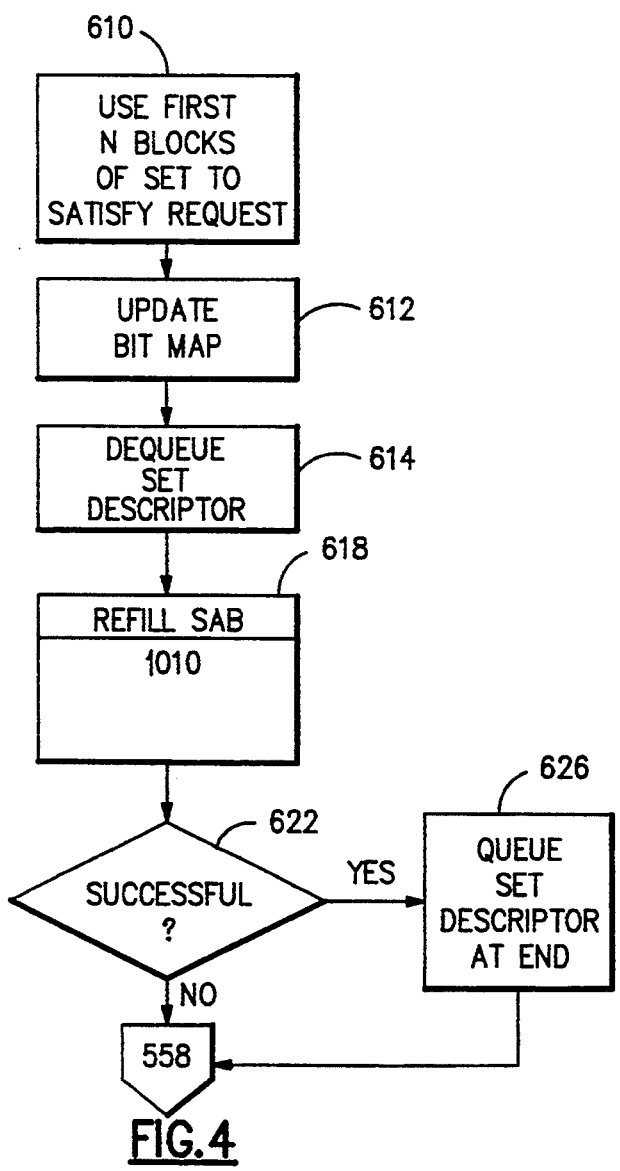
FIGS. 3-9 form a flow chart of a slot allocation routine within the computer system of FIG. 1 which routine allocates DASD to accomodate the data to be written from main storage.

Referring again to decision 526, if the length of the first set in the slot allocation buffer is exactly equal to the requested allocation, this set is immediately selected to satisfy the request (decision 526 and step 610 of FIG. 4). This is the ideal condition because one set can satisfy the request (requiring only one I/O operation) and there is no further fragmentation of available slots in the DASD. Pursuant to the selection, the bit map is updated to indicate that the slots within this set are no longer available (step 612), the selected row entry is dequeued (step 614) and the refill subroutine is called (step 618). The refill subroutine attempts to identify from the respective bit map a next large fragment or medium fragment set of contiguous available slots which is not yet represented in the slot allocation buffer for inclusion in the slot allocation buffer. If such a set exists (decision 622), it is queued at the end of the slot allocation buffer (step 626) because the set descriptors are logically arranged in order of physical address in the extent. Otherwise the slot allocation buffer remains partially empty, but still useful. Control is then returned to the block page-out routine with the real address of the allocation (step 558). In response, the block page-out routine orders the I/O subsystem to actually write the group of pages to DASD 160.

Figure 3:
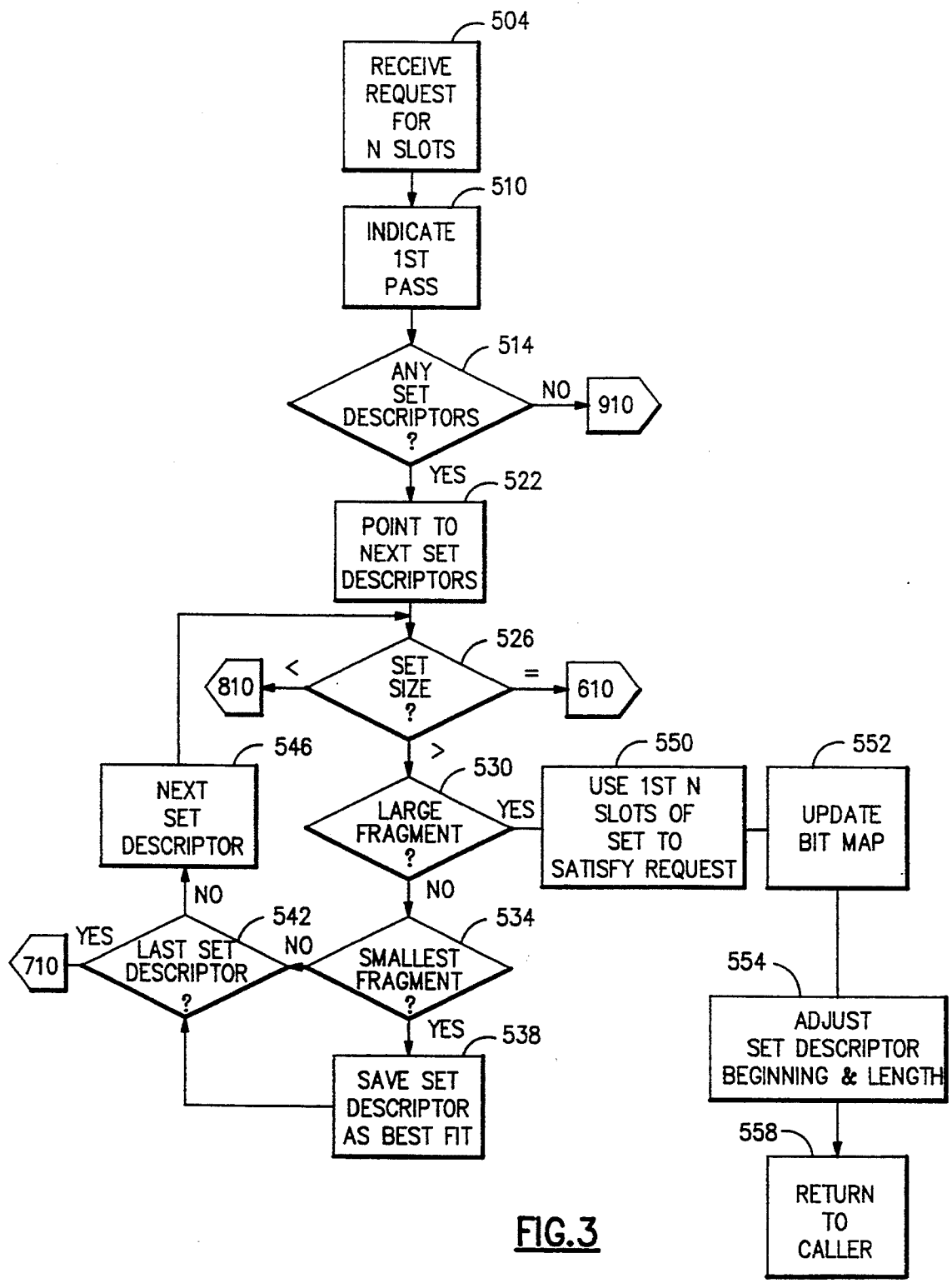
Figure 5:
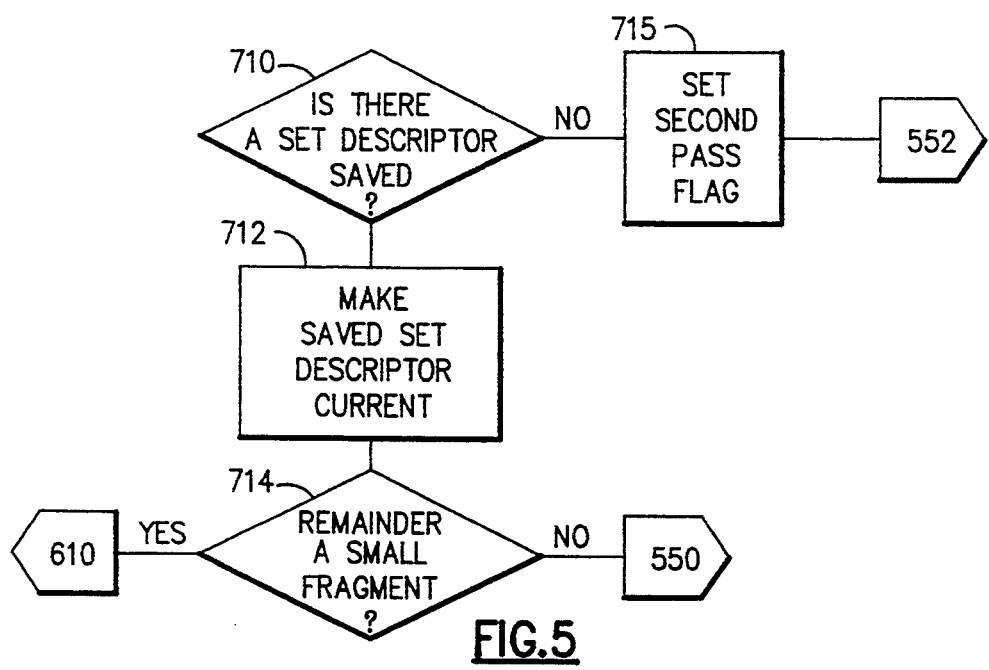
Figure 8:
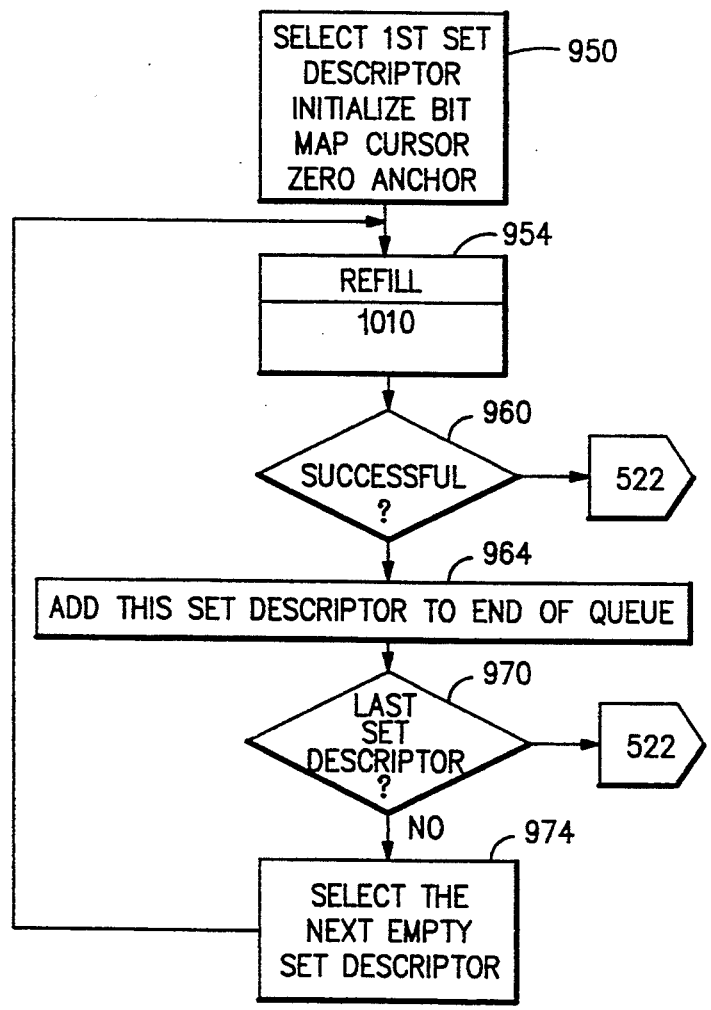
Figure 6:
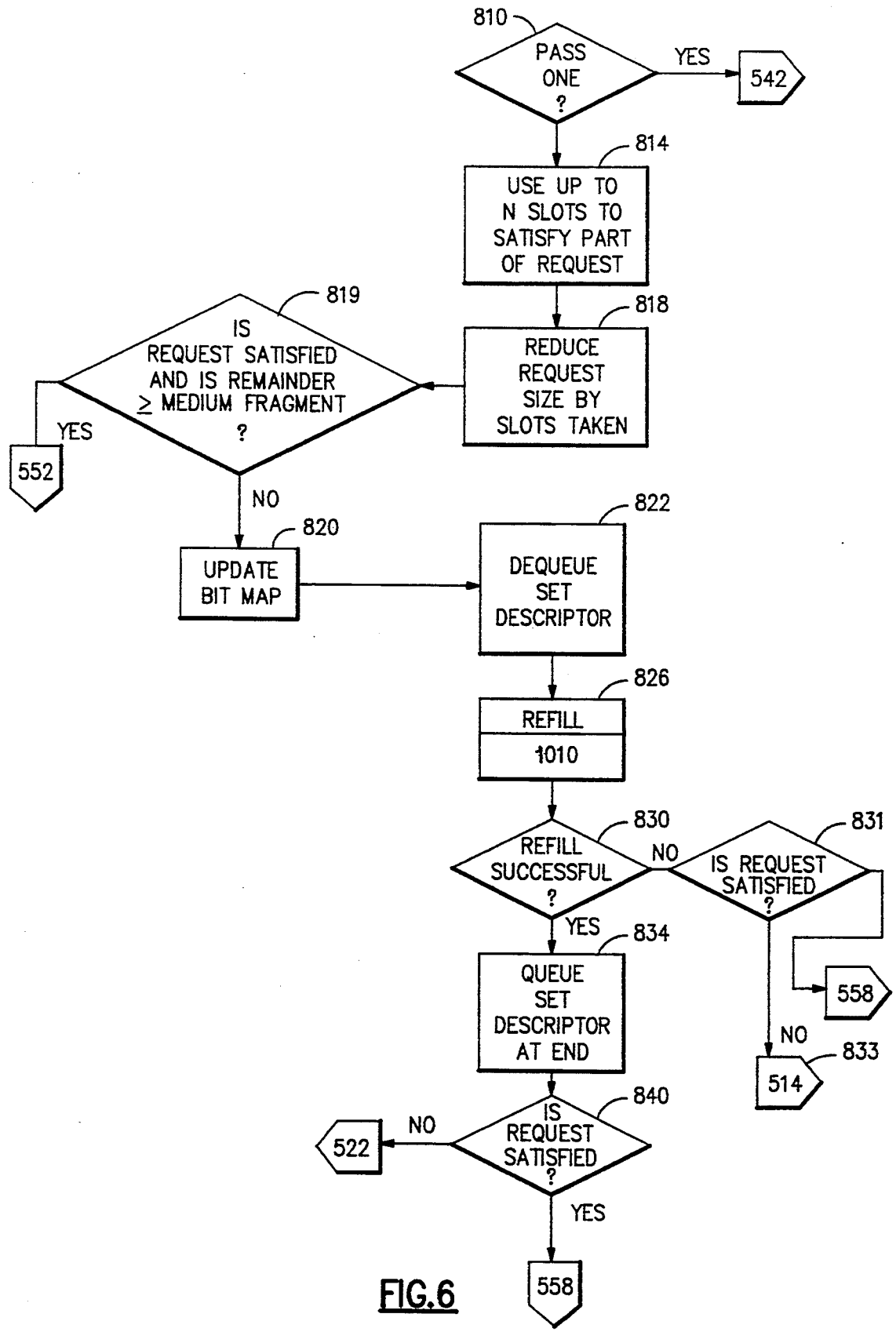
Figure 7:
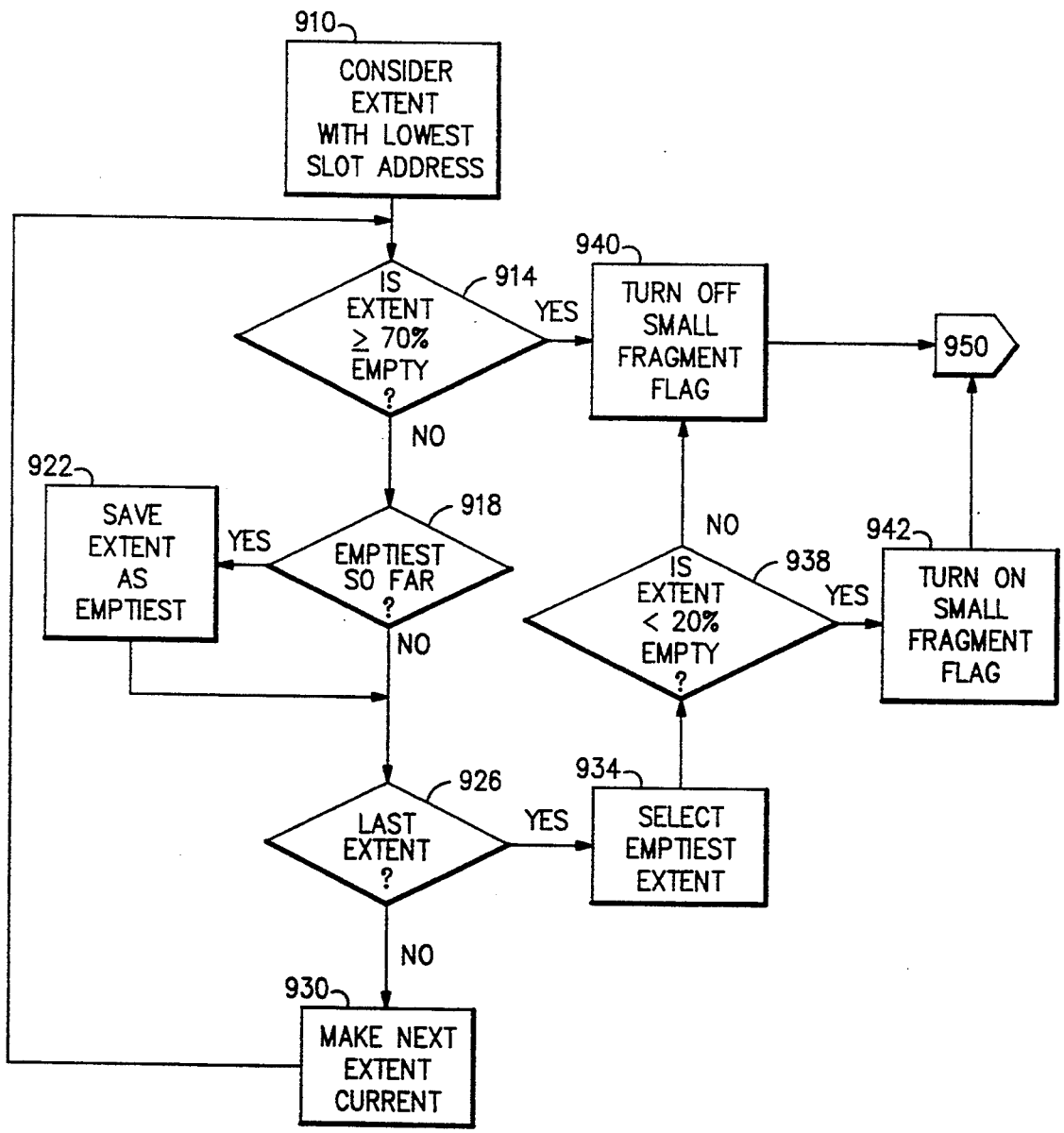
Figure 9:
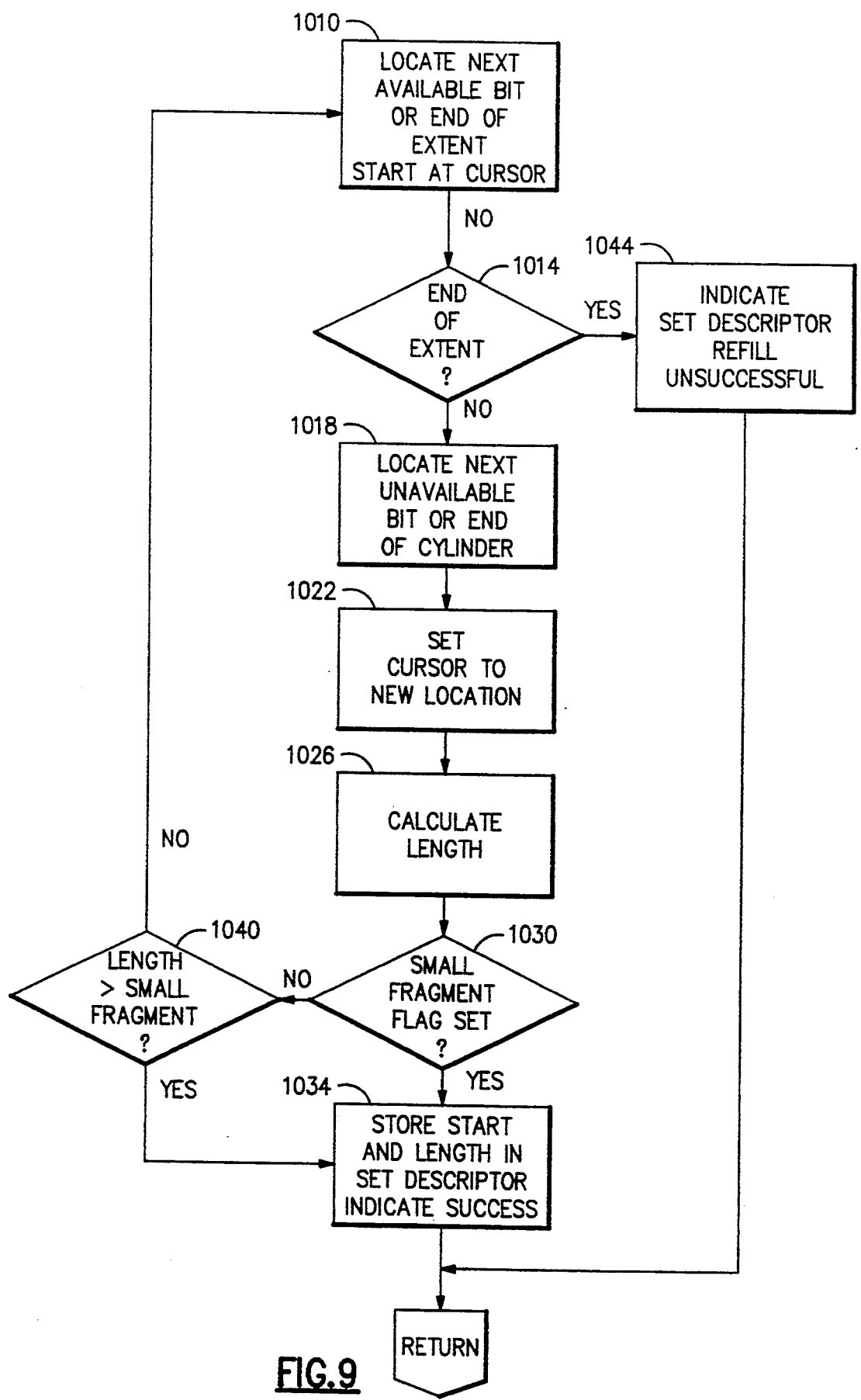

Referring again to decision 526 of FIG. 3, if the set length is greater than the requested allocation, the slot allocation routine determines if the set length exceeds the requested allocation by a large fragment, i.e. a length that is likely to satisfy most subsequent requests (decision 530). If the set length exceeds the allocation request by the large fragment, the first number of slots of the set which equal the allocation request are selected to satisfy the request (step 550). Then, the respective bit map is updated (step 552) to indicate that these slots are no longer available, and the beginning and length fields of the set descriptor are updated to represent the remaining large fragment (step 554). Then, control is returned to the block page-out routine with the real address of the allocation (step 558). In response, the block page-out routine orders the I/O subsystem 162 to actually write the group of pages into the allocated address on DASD 160.

Referring again to decision 530, if the current set length would not leave a large fragment, the slot allocation routine determines if this set leaves the smallest fragment. When this is the first set descriptor under consideration, in decision 534, the slot allocation routine determines that the current set would leave the smallest fragment, and therefore saves the address of this row entry for possible use later (step 538). Assuming there are additional set descriptors in this slot allocation buffer (decision 542), the slot allocation routine then examines the next set (step 546), and repeats the comparision to determine if this next set length equals the requested allocation (decision 526) or exceeds the requested allocation by a large fragment (decisions 526 and 530). If either decision is affirmative, then processing continues with step 610 or 550, respectively as described above because these two types of selections are preferrable to the other selection which will not leave a large fragment. Assuming neither decision is affirmative, the slot allocation routine determines if this next set length leaves a smaller fragment than the first set length (decision 534). If so, the address of this next set descriptor is saved at the expense of the first set descriptor (step 538). This loop is repeated until either decision 526 or decision 530 indicates a set whose length exactly equals the requested allocation or exceeds the requested allocation by a large fragment, or the last set descriptor is examined. When the last set descriptor in the slot allocation buffer has been examined and there have been no exact fits or set lengths that would leave a large fragment, the slot allocation routine determines if there is an entry for the set which would leave the smallest fragment (decision 710). If so, this set is made the current set descriptor (step 712). If the remaining fragment is a small fragment (decision 714), the slot allocation routine executes steps 610–630 in which the first blocks of the set which equal the requested allocation are selected to satisfy the request, the set descriptor is dequeued, and an attempt is made to replenish the slot allocation buffer. In this case, the small fragment will not now be represented by a set descriptor in the slot allocation buffer. This is an optimization to avoid the processing time that otherwise would be required to examine set descriptors for such small fragments when it is not likely that such a small fragment could ever satisfy an allocation request alone. It also avoids using such small fragments to satisfy requests that require multiple contiguous sets. However, if the remaining fragment is a medium fragment, then steps 550–554 are repeated to satisfy the request, update the respective bit map and update the beginning address and length information in the set descriptor of the slot allocation buffer.

Referring again to decision 710, if there is no entry for a set which exceeds the allocation request by a medium fragment or small fragment (and no set lengths that exactly equal the requested allocation or exceed the requested allocation by a large fragment) then there are no set lengths that can satisfy the allocation request alone. Consequently, the slot allocation routine begins the second pass through the same slot allocation buffer by setting a flag to indicate that this is no longer the first pass and two or more sets must be used to satisfy this request (step 715). Then, the slot allocation routine proceeds through step 522, decision 526, and decision 810 to step 814. In step 814, the slot allocation routine selects the first set descriptor in the queue to partially satisfy the requested allocation. Then the requested allocation is reduced by the length of the first set descriptor (step 818). Next, the slot allocation routine determines if the requested allocation has been satisfied and if there is a remainder which is greater than or equal to a medium fragment (decision 819). If not (which is the case for the first set descriptor which does not alone satisfy the request), the slot allocation routine updates the respective bit map to indicate that the slots represented by the first set descriptor are no longer available (step 820) and dequeues the first set descriptor (step 822). Next, the slot allocation routine calls the refill subroutine described above to search for and queue a next set from the same extent (step 826). If the refill is successful (decision 830), the slot allocation routine queues the new set at the end of the slot allocation buffer (step 834). Then, the slot allocation routine determines if the request has been satisfied (decision 840), and if not, continues with the next row entry (via step 522, decision 526 and decision 810) to try to satisfy the remaining allocation request. For each such set descriptor that is selected, the allocation request is reduced until it is finally satisfied. If a medium fragment or large fragment remains, the slot allocation routine branches to step 552 described above (decision 819). However, if the final set used to satisfy the allocation request exactly equals the remaining allocation request or leaves only a small fragment, then processing continues with step 558 as described above (decision 840).

Referring again to decision 830, if the refill subroutine is not successful and the request has not been satisfied (831), then the slot allocation routine continues with step 514 to utilize the next set in the current slot allocation buffer if one exists (decision 514, step 522 and decision 526) or select another extent beginning with step 910 to complete the allocation request if there are no more sets in the current extent. The routine beginning with step 910 is invoked whenever the current extent becomes empty of sets represented in the slot allocation buffer. The next extent which is described as a candidate for searching by the slot allocation routine to fulfill the present or a subsequent request is located adjacent to the previous extent to minimize radial movement of the read/write head.

Referring again to decision 831, if the request has been satisfied, the current set descriptor (which could not be successfully refilled) is left off the queue and processing continues with step 558.

Based on the foregoing, a computer system, process and programming embodying the present invention have been disclosed. However, numerous modifications and substitutions can be made without deviating from the scope of the present invention. For example, the slot allocation routine can allocate slots for records by a data base manager rather than a virtual storage manager as described above. Therefore, the present invention has been disclosed by way of illustration and not limitation, and reference should be made to the following claims to determine the scope of the present invention.

We claim:

1. A method for allocating contiguous blocks of available storage in DASD to satisfy a need for some of said storage, each said block comprising a plurality of storage locations, said method comprising the steps of:

searching for a set of contiguous available blocks of uniform size of said storage, a size of said set equalling a minimum number of blocks required to satisfy said need;

searching for another set of contiguous available blocks of said uniform size of said storage, said other set having a size equal or greater than a threshold number of blocks, said threshold number being a plurality greater than said minimum number; and if said search is not successful in identifying the minimum number set but is successful in identifying said other set, allocating for said need said minimum number of blocks from said other set without allocating any remaining blocks in said other set, said allocation from said other set being made even if the searching steps identify a third set of contiguous available storage blocks of said uniform size, said third set having a size equal to said minimum number set plus one block.

2. A method as set forth in claim 1 further comprising the steps of searching for a fourth set of contiguous available blocks of uniform size of said storage, a size of said fourth set being greater than said minimum number of blocks but less than said threshold number of blocks, and if the searches for said minimum number set and said other set are unsuccessful, then allocating said minimum number of blocks from said fourth set without allocating any remaining blocks of said fourth set.

3. A method as set forth in claim 1 further comprising the step of searching for two or more sets of contiguous available blocks of said uniform size of said storage which together have a number of blocks equal or greater than said minimum number if no single set has a number of blocks which equals or exceeds said minimum number.

4. A method as set forth in claims 3 wherein said search identifies said third set, and further comprising the step of allocating said minimum number of blocks from said two or more sets without allocating any remaining blocks in said two or more sets.

5. A method as set forth in claim 1 further comprising the step of:

recording locations and numbers of blocks of said uniform size in each of a multiplicity of sets of contiguous available storage blocks in said DASD or portions of said DASD; and wherein each of the searching steps is performed within the record.

6. A method as set forth in claim 5 wherein said record is limited to sets within one of a plurality of extents of said DASD, and if said searches are not successful in identifying said minimum number of blocks set or said other set from said one extent, further comprising the step of searching said one extent for a plurality of sets of available storage blocks which collectively equal or exceed said minimum number of blocks without searching within any other of said extents.

7. A method as set forth in claim 5 wherein said recording step avoids recording locations of or number of blocks in sets of one available block of said uniform size of said storage, the one block sets not being contiguous with any other blocks in said storage.

8. A method as set forth in claim 5 further comprising the steps of:
    making a table which logically divides the DASD into multiple extent;
    recording in the table a percentage or amount of available storage in each of said extent; and
    selecting one of said extent from which to make said record, said selection being made based on the percentage or amount of available storage in said one extent.

9. A method as set forth in claim 1 wherein said threshold number is at least three greater than said minimum number.

10. A method as set forth in claim 1 wherein said threshold number is four greater than said minimum number.

11. A method as set forth in claim 1 wherein each of said blocks has a length of one page.

12. A system for allocating contiguous blocks of available storage in DASD to satisfy a need for some of said storage, each said block comprising a plurality of storage locations, said system comprising:
    means for searching for a set of contiguous available blocks of uniform size of said storage, a size of said set equalling a minimum number of blocks required to satisfy said need, and searching for another set of contiguous available blocks of said uniform size of said storage, said other set having a size equal or greater than a threshold number of blocks, said threshold number being a plurality greater than said minimum number;
    means for allocating the minimum number set if the search for said minimum number set is successful; and
    means for allocating said minimum number of blocks from said other set without allocating any remaining blocks in said other set if said search for the minimum number set is not successful but said search for said other set is successful, said allocation from said other set being made even if the searching means identifies a third set of contiguous available storage blocks of said uniform size, said third set having a size equal to said minimum number set plus one block.

13. A method for allocating contiguous blocks of available storage in DASD to satisfy a need for some of said storage, each said block comprising a plurality of storage locations, said method comprising the steps of:
    making a bit map comprising a multitude of bits for a respective multitude of blocks of uniform size of at least part of said DASD, each of said bits indicating whether or not the respective block is available for allocation;
    using said bit map, making a record of locations and numbers of blocks in each of a multiplicity of sets of contiguous available blocks of said storage represented by said bit map;
    searching said record for one or more of said sets to allocate for said need; and
    allocating all or part of said one or more sets of contiguous storage blocks represented by said record to satisfy said need, and in response, updating said bit map to indicate that said one or more sets of contiguous available storage blocks or parts thereof that were allocated are no longer available.

14. A method as set forth in claim 13 wherein one set of contiguous storage blocks is allocated, a number of blocks in said one set equalling a minimum number required to satisfy said need, and further comprising the step of deleting from said record the location and number of blocks for said one set.

15. A method as set forth in claim 13 wherein said DASD part includes and said bit map represents available storage blocks of uniform size which are contiguous with other available storage blocks and also available storage blocks of uniform size which are not contiguous with any other available storage blocks, and the step of making said record identifies said blocks which are not contiguous and said sets of contiguous blocks, and includes in said record said sets of contiguous blocks but excludes from said record said blocks which are not contiguous.

16. A method as set forth in claim 13 wherein said bit map represents all of the storage blocks in an extent of said DASD and said record represents substantially fewer than all sets of contiguous available storage blocks in said extent.

17. A method as set forth in claim 13 wherein said DASD part includes and said bit map represents sets of contiguous available storage blocks and also available storage blocks which are not contiguous with any other available storage blocks, and the step of making said record identifies said blocks which are not contiguous and said sets of contiguous blocks, includes in said record sets of contiguous blocks having a size greater than two blocks but excludes from said record said blocks which are not contiguous and sets of contiguous blocks having a size equal to two blocks.

18. A method as set forth in claim 13 wherein said DASD part includes and said bit map represents sets of contiguous available storage blocks and also available storage blocks which are not contiguous with any other available storage blocks, and the step of making said record identifies said blocks which are not contiguous and said sets of contiguous blocks, includes in said record sets of contiguous blocks having a size greater than three blocks but excludes from said record said blocks which are not contiguous and sets of contiguous blocks having a size less than or equal to three blocks.

19. A method as set forth in claim 13 wherein each of said blocks has a length of one page.

20. A method as set forth in claim 13 wherein the record is limited to sets of predetermined size or greater when the DASD part has a predetermined percentage or amount of available storage but is extended to include sets of less than said predetermined size when the DASD part has lesser availability than said predetermined percentage or amount of available storage.

21. A method as set forth in claim 13 wherein the sets whose locations and numbers of blocks are recorded are recorded in ascending or descending order of DASD address and the searching step is perform in ascending or descending order of DASD address.

22. A system for allocating contiguous blocks of available storage in DASD to satisfy a need for some of said storage, each said block comprising a plurality of storage locations, said system comprising:
    means for making a bit map comprising a multitude of bits for a respective multitude of blocks of uniform size of at least part of said DASD, each of said bits indicating whether or not the respective block is available for allocation;

means for making from said bit map a record of locations and numbers of blocks in each of a multiplicity of sets of contiguous available blocks of said storage represented by said bit map;

means for searching said record for one or more of said sets to allocate for said need; and means for allocating blocks from said one or more sets for said need and updating said bit map and record to indicate that the blocks have been allocated.

23. A method for allocating contiguous blocks of available storage in DASD to satisfy a need for some of said storage, each said block comprising a plurality of storage locations, said method comprising the steps of:

identifying a set of contiguous available blocks of uniform size of said storage;

determining if said set has a size equal to a minimum number of blocks required to satisfy said need; and determining if said set has a size equal or greater than a threshold number of blocks, and if so, allocating for said need said minimum number of blocks from said set without allocating any remaining blocks in said set, said threshold number being a plurality greater than said minimum number; and wherein if said set has a size greater than said minimum number of blocks but less than said threshold number of blocks, then not allocating any blocks from said set for said need and further comprising the step of repeating the foregoing steps for another set of contiguous available storage blocks.

24. A system for allocating contiguous blocks of available storage in DASD to satisfy a need for some of said storage, each said block comprising a plurality of storage locations, said system comprising:

means for identifying a set of contiguous available blocks of uniform size of said storage;

means for determining if said set has a size equal to a minimum number of blocks required to satisfy said need, and if so allocating said set for said need;

means for allocating the equal number set if the search for said equal number set is successful; and means for determining if said set has a size equal or greater than a threshold number of blocks, and if so, allocating for said need said minimum number of blocks from said set without allocating any remaining blocks in said set, said threshold number being at least two greater than said minimum number; and wherein the identifying means and both determining and allocating means perform their respective functions for another set of contiguous available storage blocks for said need if said set has a size greater than said minimum number of blocks but less than said threshold number of blocks.

* * * * *